US007908269B2

(12) United States Patent
Tiemann et al.

(10) Patent No.: US 7,908,269 B2
(45) Date of Patent: *Mar. 15, 2011

(54) METHOD, SYSTEM, AND SOFTWARE FOR TRANSMISSION OF INFORMATION

(75) Inventors: Duane E. Tiemann, Ossining, NY (US); Susan A. Hall, Putnam Valley, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 708 days.

This patent is subject to a terminal disclaimer.

(21) Appl. No.: 11/196,819

(22) Filed: Aug. 3, 2005

(65) Prior Publication Data

US 2006/0015632 A1    Jan. 19, 2006

Related U.S. Application Data

(63) Continuation of application No. 09/826,552, filed on Apr. 4, 2001, now Pat. No. 7,171,443.

(51) Int. Cl.
*G06F 17/30* (2006.01)
*G06F 17/28* (2006.01)

(52) U.S. Cl. ........ 707/726; 707/729; 707/806; 715/205; 715/234

(58) Field of Classification Search .......... 707/1–2, 707/9–10, 100–104.1, 609, 705–711, 723–724, 707/728–730, 736, 748, 754, 770, 777, 821–822, 707/825, 829, 726, 806, 811; 715/513, 243, 715/234, 255, 205, 209, 229; 709/217–219; 726/3; 705/26–27

See application file for complete search history.

(56) References Cited

U.S. PATENT DOCUMENTS

| 5,634,052 | A |   | 5/1997  | Morris |
|-----------|---|---|---------|--------|
| 5,835,712 | A | * | 11/1998 | DuFresne ..................... 709/203 |
| 5,987,480 | A | * | 11/1999 | Donohue et al. ............. 715/207 |
| 6,014,698 | A | * | 1/2000  | Griffiths ....................... 709/224 |
| 6,021,426 | A | * | 2/2000  | Douglis et al. ............... 709/200 |
| 6,061,715 | A |   | 5/2000  | Hawes |
| 6,064,982 | A | * | 5/2000  | Puri ............................... 705/27 |
| 6,094,662 | A |   | 7/2000  | Hawes |
| 6,105,043 | A | * | 8/2000  | Francisco et al. ............ 715/234 |
| 6,184,878 | B1| * | 2/2001  | Alonso et al. ................ 725/109 |
| 6,199,107 | B1|   | 3/2001  | Dujari |
| 6,230,196 | B1| * | 5/2001  | Guenthner et al. .......... 709/223 |

(Continued)

FOREIGN PATENT DOCUMENTS

EP    0398650  A2    11/1990

(Continued)

OTHER PUBLICATIONS

U.S. Appl. No. 60/054,366.*

(Continued)

*Primary Examiner* — Srirama Channavajjala
(74) *Attorney, Agent, or Firm* — Toler Law Group, I.P.

(57) ABSTRACT

A method, system and software for efficient transmission of information having dynamic information and static information are disclosed herein. The method includes dividing at a server location into dynamic and static information. The method further includes receiving a first request and a second request from a user location. The method also includes sending the dynamic information to the user location in response to the first location, and sending the static information to the user location in response to the second request.

22 Claims, 9 Drawing Sheets

U.S. PATENT DOCUMENTS

| | | | |
|---|---|---|---|
| 6,249,844 B1 | 6/2001 | Schloss et al. | |
| 6,289,347 B1* | 9/2001 | Giroux | 707/10 |
| 6,397,246 B1* | 5/2002 | Wolfe | 709/217 |
| 6,507,848 B1* | 1/2003 | Crosby et al. | 707/102 |
| 6,539,370 B1* | 3/2003 | Chang et al. | 707/2 |
| 6,606,525 B1* | 8/2003 | Muthuswamy et al. | 700/52 |
| 6,668,369 B1* | 12/2003 | Krebs et al. | 717/125 |
| 6,779,152 B1* | 8/2004 | Conner et al. | 715/207 |
| 6,826,594 B1* | 11/2004 | Pettersen | 709/203 |
| 6,941,512 B2* | 9/2005 | Cheng | 715/239 |
| 6,990,653 B1* | 1/2006 | Burd et al. | 717/108 |
| 7,062,506 B2* | 6/2006 | Taylor et al. | 707/102 |
| 7,120,897 B2* | 10/2006 | Ebbo et al. | 717/108 |
| 7,139,814 B2* | 11/2006 | Dinovo | 709/219 |
| 7,171,455 B1* | 1/2007 | Gupta et al. | 709/219 |
| 7,174,506 B1* | 2/2007 | Dunsmoir et al. | 715/207 |
| 7,689,902 B1* | 3/2010 | Olawsky et al. | 715/234 |
| 2001/0051961 A1* | 12/2001 | Duxbury | 707/517 |
| 2003/0014443 A1* | 1/2003 | Bernstein et al. | 707/513 |
| 2003/0110272 A1* | 6/2003 | du Castel et al. | 709/229 |
| 2003/0151621 A1* | 8/2003 | McEvilly et al. | 345/744 |
| 2003/0177175 A1* | 9/2003 | Worley et al. | 709/203 |

FOREIGN PATENT DOCUMENTS

| | | | |
|---|---|---|---|
| EP | 0646856 | A2 | 4/1995 |
| EP | 0898235 | A2 | 2/1999 |
| EP | 1182589 | A2 | 2/2002 |
| WO | WO 99/08182 | * | 2/1999 |
| WO | WO 99/59087 | * | 11/1999 |

OTHER PUBLICATIONS

Anders Kristensen, "Template resolution in XML/HTML", vol. 30, issue 1-7, Apr. 1998, pp. 1-11.*

Kristensen, Anders, "Template Resolution in XML/HTML," Computer Networks and ISDN Systems 30 (1998), BNS DOC ID XP4121423A, pp. 239-249.

Ng, W. et al, "Internet Based Lanugage: JavaScript," BNS DOC ID XP2274064A1, Nov. 24, 1998, pp. 1-19.

Microsoft Press Computer Dictionary, Third Edition, Published by Microsoft Press, 1997, pp. 268-269.

International Search Report for International Application No. PCT/US02/10243, Mailed on Apr. 26, 2004.

European Patent Office Communication, Dated Sep. 16, 2004.

European Patent Office Brief Communication, Dated Nov. 4, 2008.

Decision to Refuse European Patent Application, Dated Nov. 13, 2008.

* cited by examiner

METHOD, SYSTEM, AND SOFTWARE FOR TRANSMISSION OF INFORMATION

REFERENCE TO PRIOR APPLICATION

This is a continuation application of U.S. patent application Ser. No. 09/826,552 filed on Apr. 4, 2001, the contents of which is expressly incorporated herein by reference in its entirety.

FIELD OF THE DISCLOSURE

The present disclosure relates generally to transmission of information and more particularly to transmission of information over a network.

BACKGROUND

Data server systems, such as web servers, are often used to transmit information to users. For example, web sites on the World Wide Web utilize one or more data servers to distribute data associated with web pages. After receiving a request for a web page associated with a uniform resource locator (URL) or Internet address, the data servers transmits a hypertext markup language (HTML) files and its associated image files to the user sending the request.

The data transmitted by data server systems to users often has one or more static portions and one or more dynamic portions, where the dynamic portions change more frequently than the static portions. For example, a HTML file could have one or more portions that represent a stock ticker or links to news articles on other web sites. Since these portions change much more frequently than other portions of the HTML file, such as legal disclaimer language, indices of links to search engine sites, etc., they may be considered to be dynamic, while the other portions may be considered to be static. A major limitation of data server systems is that the entire HTML file, i.e. both the static and dynamic portions used to reproduce a set of information is transmitted each time the user requests a particular set of information, even if there is no or relatively little changed information. Sending the entire HTML file usually results in an increase in transmission time and/or a decrease in the available bandwidth.

Given this limitation, as discussed, it is apparent that a way to reduce transmission time or the required bandwidth would be advantageous.

BRIEF DESCRIPTION OF THE DRAWINGS

Various objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE DRAWINGS

FIGS. 1-9 illustrate a networked system for efficient transmission of information, as well as a method for its use. In at least one embodiment, the networked system includes a remote site, one or more users, and a network to connect the remote site to the users. A user sends a request for a set of information having dynamic information and static information to the remote site. The remote site, responding to the user's request, determines one or more dynamic portions and/or one or more static portions of the set of information. In one embodiment, a template representative of the set of information is used to aid in the determination and segregation of dynamic and static portions. The remote site transmits one or more dynamic portions to the user, as well as instructions or references for accessing the one or more static portions local to the user. If the contents of the static portions are not locally accessible to the user, the user can request the static portions from the remote site. The user uses the transmitted dynamic portions and the references to the static portions stored locally to reconstruct the original set of information. One advantage of one embodiment of the present invention is that transmission time for a set of information having dynamic and static information may be reduced by transmitting only the dynamic information. Another advantage of one embodiment of the present invention is that the amount of bandwidth used to transmit a set of information having dynamic and static information to a user may be reduced by using information accessible to the user locally.

Figure 1:
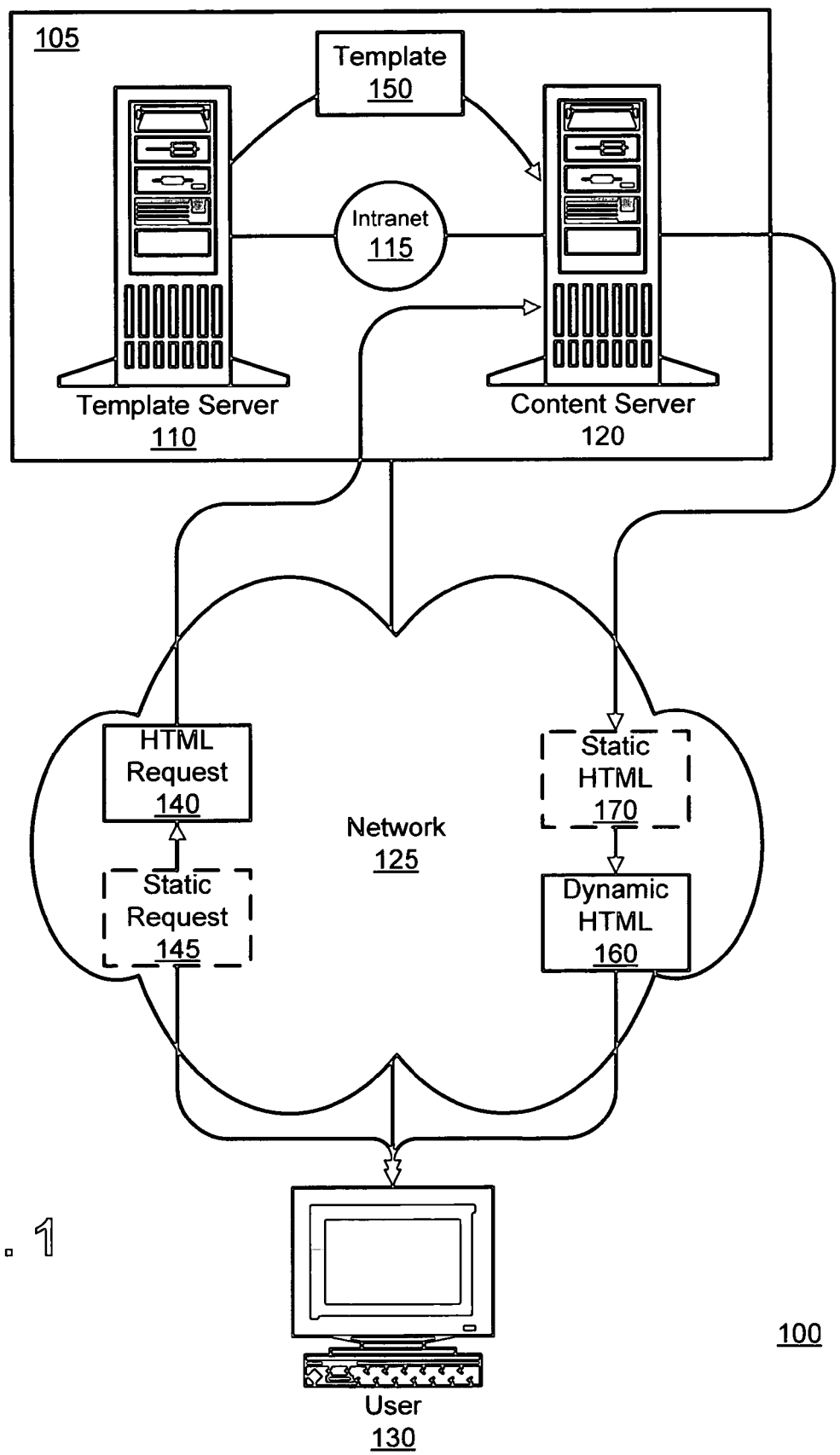
FIG. 1 is a block diagram illustrating a networked system according to at least one embodiment of the present invention.
Figure 2:
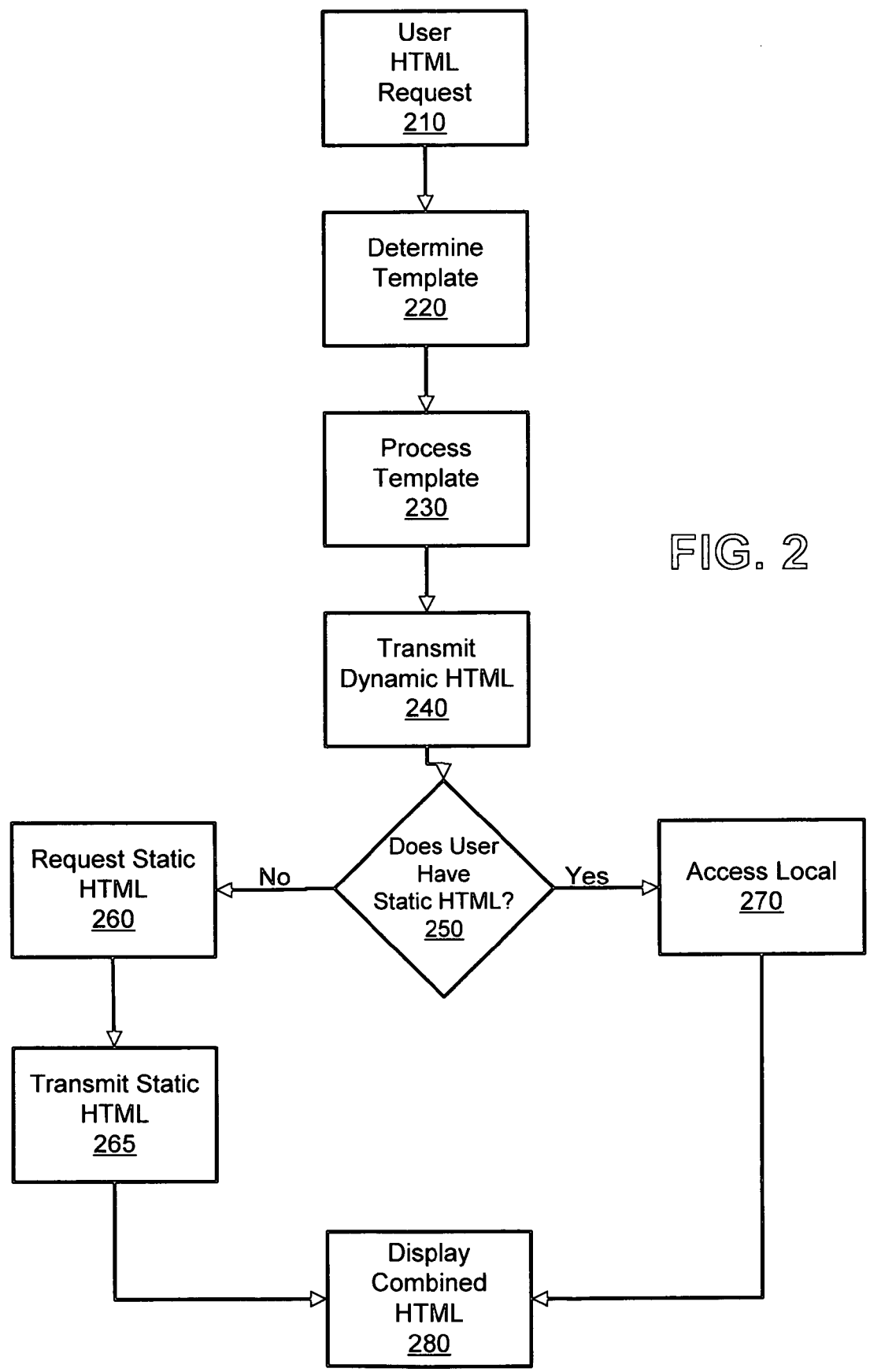
FIG. 2 is a flow diagram illustrating a method for transmitting information using the networked system of FIG. 1 according to at least one embodiment of the present invention.

Referring now to FIGS. 1 and 2, a system and method for improved delivery of information is illustrated according to at least one embodiment of the present invention. Networked system 100 includes user 130, network 125, and remote site 105. User 130 can include any number of devices capable of receiving and processing information, such as a computer, a digital phone, and the like. For example, user 130 could be a desktop computer connected to the Internet (network 125) capable of requesting and receiving hypertext markup language (HTML) files from a remote HTML server (remote site 105) and interpreting the received HTML files for display.

Network 125 can include a variety of networks or connections between user 130 and remote site 105. For example, network 125 could include the Internet, a wireless network, a local area network (LAN), a serial connection, a bus, and the like. Remote site 105, in one embodiment, includes intranet 115, template server 110, and content server 120. Intranet 115, as with network 125, can include any network or connection between template server 110 and content server 120, such as a LAN, a serial connection, a bus, etc. In one embodiment, intranet 115 and network 125 are the same network. Template server 110 and content server 120 can include any devices capable of processing and outputting information or data, such as a personal computer, a workstation, a server, and the like. In at least one embodiment, template server 110 and content server 120 are implemented in a same device.

Although networked system 100 can be utilized for transmission of dynamic and static information having various formats to user 130, a method incorporating an embodiment where the dynamic and static information are based on a markup language or control information, such as HTML, is illustrated for ease of discussion. In step 210, user 130 sends or transmits HTML request 140 to remote site 105, where HTML request 140, in one embodiment, is a request for a monolithic HTML files associated with a HTML uniform resource locator (URL). In another embodiment, HTML request 140 could include a request for multiple HTML files associated with a HTML URL. Note that the term "URL," as used herein, may be used to refer to an address or location used by user 130 to locate or identify one or more files or sets of information on remote site 105, or "URL" may be used to refer to the actual one or more files or sets of information. In one embodiment, remote site 105 determines the capability of user 130 to implement embodiments of the present invention. For example, if user 130 utilizes a web browser to request HTML files from remote site 105, remote site 105 could check the version of the web browser, such as by using a hypertext transfer protocol user agent header sent by user 130, to determine if the user web browser is capable of supporting the methods disclosed herein. For example, at least one embodiment of the present invention makes use of the JavaScript programming language. If a web browser does not support the necessary version of JavaScript, remote site 105 may choose to handle the request for an HTML file from user 130 using alternative methods, including transferring the entire HTML file.

In one embodiment, content server 120 at remote site 105 determines template 150 associated with HTML request 140 in step 220. Since template 150 may be occasionally updated, template server 110, in one embodiment, is utilized as a staging area for updated templates 150. In this case, each time template 150 is updated, template server 110 can transmit the updated template 150 over intranet 115 to content server 150, where the updated template 150 can be stored. Template 150, in one embodiment, is a file or set of data used to develop a finished set of information based on template 150. For example, template 150 can contain HTML control information, instructions, text, and context specific identifiers, herein referred to as tags, used to construct one or more HTML files to be sent to user 130. The format and content of template 150 can be based on the HTML URL requested by user 130, the identity or other property of user 130, and the like.

In at least one embodiment, template 150 includes data or information used by content server 120 to divide the information associated with template 150 into dynamic information and static information. The term "dynamic information," as used herein, refers to a portion of information associated with a set of information that changes or is modified relatively frequently. On the other hand, the term "static information," as used herein, refers to a portion of information associated with the set of information that changes or is modified less frequently. For example, the set of information could include HTML data used to display a web site on a user's web browser. The dynamic information could include information, such as instructions and other indicators, associated with elements of the website that change frequently, such as articles from other websites, news highlights, stock tickers, and the like. Static information could include instructions or information associated with elements of the website that change less frequently (or do not change at all), such as legal disclaimers, links to other websites, etc. It will be appreciated that the threshold between information that changes frequently or less frequently is often dependent on the attributes of the requested information, and may be determined in any number of ways without departing from the spirit or the scope of the present invention.

In step 230, content server 120, in one embodiment, uses template 150 to determine the one or more static portions and one or more dynamic portions of the information associated with template 150. Methods for determining static and dynamic portions are discussed in greater detail herein. In step 240, content server 120, in one embodiment, generates dynamic HTML file 160 and then transmits dynamic HTML file 160 to user 130. Dynamic HTML file 160 includes some or all of the dynamic information or data associated with the HTML file or files requested using HTML request 140. Dynamic HTML file 160 further includes instructions or references for accessing the static portion of the information locally on user 130. It will be appreciated that in some cases, user 130 may request information that is represented by a plurality of files or sub-sets of information. If user 130 requests a HTML file associated with a URL, the web page that the HTML file represents could include a number of HTML files. For example, if a web page has two frames, the web page will often be represented by three HTML files: one file to set up the overall format of the web page and then reference two other HTML files; one HTML file containing the content and control information for one frame; and another HTML file containing the content and control information for the other frame. This could necessitate the transmission of three dynamic HTML files 160, each one corresponding to one of the three HTML files. Accordingly, any discussions herein regarding the requesting, processing, or transmission of information associated with a single template 150 or single HTML file can also apply to information associated with a plurality of templates 150 or HTML files unless otherwise noted.

Upon receipt of dynamic HTML file 160, user 130 attempts to display the original information using the dynamic portion for locally accessing the static portion from dynamic HTML file 110. As discussed in greater detail subsequently, dynamic HTML file 160 can include references, such as JavaScript function calls, for accessing the static portion from a local file. In step 250, user 130 determines if the static portions are locally accessible. If the file containing the static portion is not located on user 130 or is not locally accessible by user 130, in one embodiment, user 130 requests the static file by sending static request 145 to remote site 105 in step 260. In step 265, remote site 105 receives static request 145 and transmits static HTML file 170 to user 130, where user 130 receives static HTML file 170 and stores the file locally. In one embodiment, content server 120 generates static HTML file 170 upon receipt of a request for the static file and then transmits static HTML file 170 to user 130. In another embodiment, content server 120 generates static HTML file

170 previous, during, or subsequent to the generation of dynamic HTML file 160 and then transmits static HTML file 170 to user 130 either before or after dynamic HTML file 160, as appropriate. In one embodiment, static HTML 170 may be identified by use of a timestamp, where the timestamp can reference a date and/or a specific time. For example, dynamic HTML file 160 could include reference static HTML file 170 by using a filename assigned to static HTML file 170, where the filename is formed, in part, from a timestamp associated with static HTML file 170, such as "static file 010100141425.html" where "010100141425" is formed from a timestamp having the date of Jan. 1, 2000 and a specific time of 2:14.25 PM. In at least one embodiment, the timestamp refers to the date and/or time that static HTML file 170 was created or last modified. It will be appreciated that the timestamp could, in other embodiments, indicate the date and/or time static HTML file 170 was copied, archived, etc.

Else if the user 130 already has local access to the static HTML file 170, user 130 accesses this file in step 270. In step 280, user 130 uses dynamic HTML file 170 and the locally accessible static HTML file 170 to generate and/or display the static and dynamic portions of the original information in combination. Methods for using dynamic HTML file 160 and static HTML file 170 to generate or display the original set of information are discussed in greater detail subsequently.

By segregating a set of information, such as a web site, into a dynamic portion and a static portion, the time and/or bandwidth needed to transmit the information can be reduced since remote site 105 will only need to send the dynamic portion of the information each time user 130 requests the set of information, assuming user 130 is capable of accessing the static portion locally or that the static portion has not changed. In the event that user 130 is requesting the set of information for the first time, both the static and dynamic portions may need to be transmitted at that time. However, subsequent requests for the same unchanged set of information will often only result in the transmission of the dynamic portion, thereby reducing the time and/or bandwidth required for user 130 to receive and process the set of information. For example, if 70% of a set of information is static information and the remaining 30% is dynamic, and there is a 5% overhead for the instructions needed to reference the static portion locally, all other things being equal, there could be a reduction in transmission time of 65% (100%−30%+5%/100%).

Although networked system 100 was discussed in the context of user 130 requesting, receiving, and displaying one or more HTML files associated with a URL, information having dynamic and static portions having other monolithic formats may be efficiently transmitted using the previous discussed method with appropriate modifications. For example, networked system 100 could be used to download a Java applet having dynamic and static portions from remote site 105 to user 130.

Figure 3:
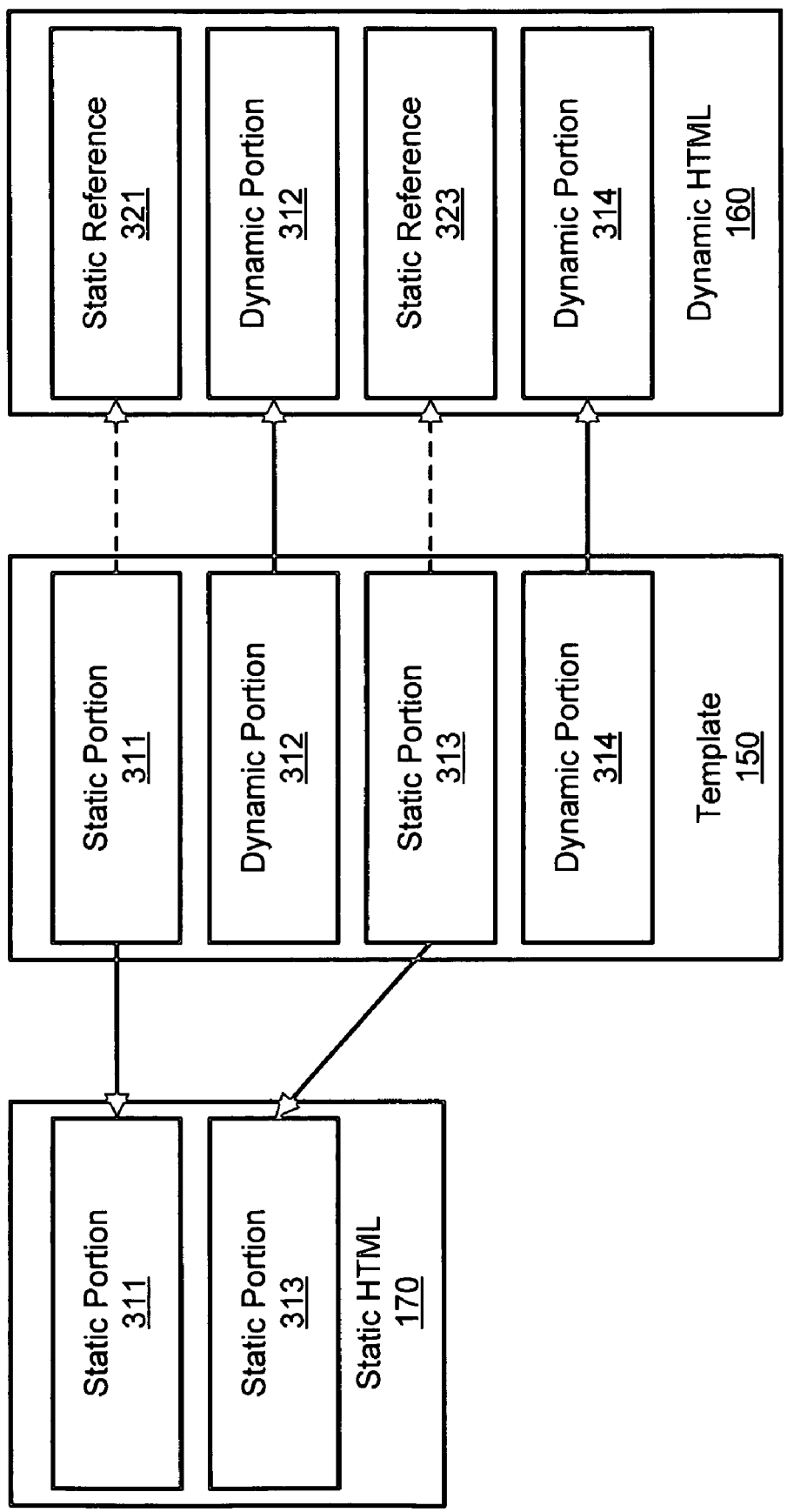
FIG. 3 is a block diagram illustrating a method for segregating a set of information into dynamic portions and static portions according to at least one embodiment of the present invention.
Figure 4:
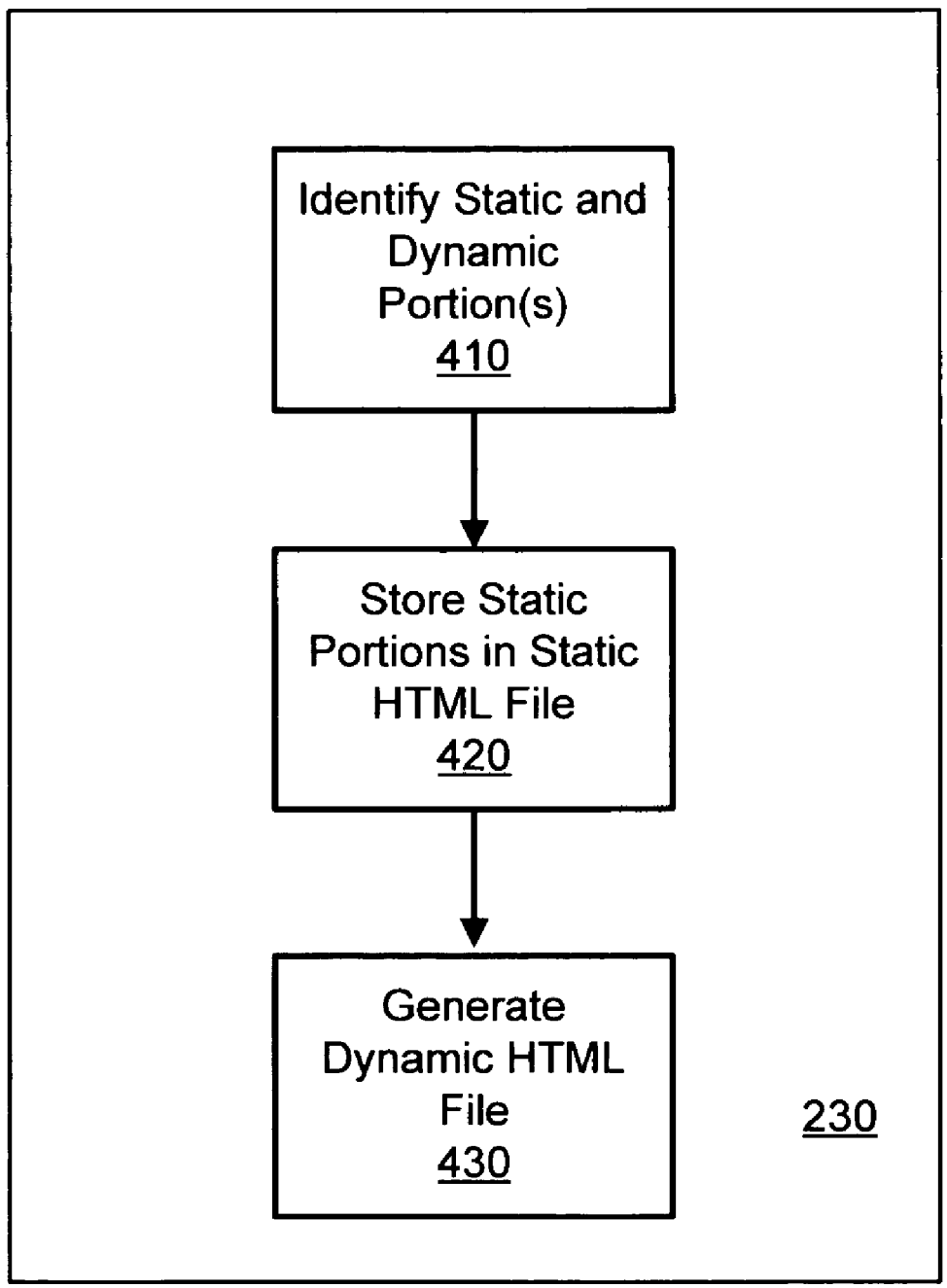
FIG. 4 is a flow diagram illustrating a method for segregating a set of information into dynamic portions and static portions according to at least one embodiment of the present invention.

Referring next to FIGS. 3 and 4, a method for segregating static and dynamic information is illustrated according to at least one embodiment of the present invention. As discussed previously with reference to step 230 of FIG. 2, in at least one embodiment, a set of information to be sent to user 130 (FIG. 1) is segregated into one or more dynamic portions and one or more static portions. An embodiment where this information includes display content associated with a web site or web page and is represented, at least in part, by one or more HTML files is illustrated for ease of discussion. The following method can also be used on other information formats, with the appropriate modifications.

After determining template 150 associated with HTML request 140 (FIG. 1), content server 120 determines static and dynamic portions of a set of information represented by template 150 in step 410. In one embodiment, static and dynamic portions are indicated by use of an identifier. For example, template 150 could use a "CACHE@" tag to indicate static portions of an HTML file. An example of the contents of an HTML file (template 150) using a "CACHE@" tag follows:

```
<HTML>
<HEAD>
    <TITLE>Example HTML</TITLE>
</HEAD>
<FRAMESET FRAMEBORDER=NO BORDER=0 ROWS="100,*">
    <FRAME NAME="title" SRC="title.html" SCROLLING="NO">
        <FRAMESET FRAMEBORDER=NO BORDER=0 COLS="155,*">
</FRAMESET>
@CACHE(<SCRIPT LANGUAGE="JavaScript">
    function isblank(s) {
        for (var i = 0; i < s.length; i++ ) {
            var c = s.charAt(i);
            if ( (c 1 = ' ' ) && (c 1 = '\n') && (c 1 = '\t') ) return false;
        }
        return true;
    }
</SCRIPT>)@
@CACHE(<SCRIPT LANGUAGE="JavaScript">
    function isnotblank(s) {
        for (var i = 0; i < s.length; i++ ) {
            var c = s.charAt(i);
            if ( (c == ' ' ) || (c == '\n') || (c == '\t') ) return false;
        }
        return true;
    }
</SCRIPT>)@
<BODY>
</BODY>
</HTML>
```

In the previous example HTML file, the portions of the HTML file starting with "@CACHE" and ending with "@" are, in this example, considered as static portions of the HTML file while the remainder of the HTML file can be considered dynamic information since it is not preceded by "@CACHE(". Content server 120 can then use the "@CACHE" tag to determine the one or more static portions of template 150. Alternately, an identifier may be used to indicate the dynamic portions of template 150. In one embodiment, identification of static and/or dynamic portions and/or the subsequent placement of identifiers, such as "@CACHE", can be performed automatically by a utility or process on remote site 105 (FIG. 1). For example, content server 120 could analyze the information in template 150 for known static or dynamic information, or for keywords that indicate a static or dynamic portion, etc. In another embodiment, static and/or dynamic portions of template 105 are determined and/or identified manually by an administrator or other operator at remote site 105. Note that care should often be taken when using tags such as "@CACHE" to identify static portions of a file or set of information. For example, HTML tags should not be split between dynamic and static portions, so HTML tags and comments should be carefully analyzed to determine whether they are truly dynamic or static. For example, HTML comments often have unique begin and end sequences which are similar to the begin and end sequences of HTML tags. In this case, HTML comments could mistakenly be identified as a HTML tag. As a result, the HTML comment could be mistakenly identified as dynamic when it is, in actuality, potentially causing errors in the processing and/or display of the static and or dynamic HTML portions.

After identifying the one or more static and/or dynamic portions of template 150, static HTML file 170 representing the one or more static portions of template 150 is generated in step 420. For example, assume template 150 of FIG. 3 includes static portions 311, 313 and dynamic portions 312, 314. The contents of static portions 311, 313 are copied into static HTML file 170. In at least one embodiment, static HTML file 170 is a JavaScript file and the contents of static portions 311, 313 are formatted into a JavaScript array stored in static HTML file 170. An example of the contents of static HTML file 170 having a JavaScript array (using the previous HTML example):

the like. As discussed previously, in one embodiment, static HTML file 170 is not generated until specifically requested by user 130. In an alternate embodiment, a separate static HTML file 170 is generated for each static portion of the set of information requested by user 130. However, this may cause additional transmission and/or processing effort. For example, if user 130 requests an HTML file to be displayed on a web browser and content server 120 delivers a plurality of static HTML files 170, one for each static portion of the HTML file, many web browsers will do a version check on each static HTML file 170, thereby increasing the transmission time and delaying the display of the web page represented by the HTML file. If only one static HTML file 170 is transmitted, the web browser need only perform one version check.

In at least one embodiment, the filename of static HTML file 170 is generated based on the filename of template 150 and/or timestamp associated with template 150. For example, if the filename of template 150 is "userid.tmp" and it was last modified on Jan. 1, 2001 at 12:00.00 AM and if static HTML file 170 is a file having a JavaScript array, the filename for static HTML file 170 could be "userid0012001120000js." If remote site 105 includes a number of template servers 110 and/or content servers 120 and template 150 is mirrored across the servers of remote site 105, care should be taken to maintain the same timestamp for all copies of template 150 at remote site 105 if static HMTL files 170 generated from template 150 (or its mirrored copies) use this naming convention. Otherwise user 130 could request static HTML file 170 using a filename generated on one content server 120 from another content server 120 that has a different filename for the same static HTML file 170 because of a different timestamp.

In addition to potentially having different filenames for copies of the same static HTML file 170, remote sites 105 with multiple content servers 120 (or template servers 110) could cause user 130 to receive dynamic HTML file 160 from one content server 120 and subsequently request the associated static HTML file 170 from another content server 120, where static HTML file 170 has not been generated on the

```
A = new Array( );
A[1] = '<SCRIPT LANGUAGE="JavaScript">\r\n'+         (contents of static portion
                                                      311)
'       function isblank(s) {'\r\n+
'           for (var i = 0; i < s.length; i++ ) {'+
'               var c = s.charAt(i);'+
'               if ( ( c != \' \' ) && (c != \'\n\') && (c != \'\t\') ) return false;'+
'           }'+
'           return true;'+
'       }'+\r\n
'</SCRIPT\r\n>';
A[2]='<SCRIPT LANGUAGE="JavaScript">\r\n'+ (contents of static portion 313)
'       function isnotblank(s) {'\r\n+
'           for (var i = 0; i < s.length; i++ ) {'+
'               var c = s.charAt(i);'+
'               if ( ( c == \' \' ) || (c == \'\n\') || (c == \'\t\') ) return false;'+
'           }'+
'           return true;'+
'       }'+\r\n
'</SCRIPT\r\n>';
```

In the previous example of the contents of static HTML file 170, the contents of static portion 311 are stored as element 1 of JavaScript array "A" and the contents of static portion 313 are stored as element 2 of JavaScript array "A". In other embodiments, the contents of static portions 311, 313 can be stored in static HTML file 170 using other methods as appropriate, such as storage in a database file, a simple text file, and other content server 120. To prevent this, in one embodiment, requests from a same user 130 within a predetermined time period are always routed to the same content server 120 that handled the most recent request from user 130. The predetermined time period incorporates adequate time for user 130 to determine whether the contents of static HTML file 170 are locally accessible, and if not, to request static HTML file 170 from the same content server 120. In another embodiment, static HTML file 170 could be generated on a staging server at remote site 105 and then distributed to all content servers 120.

In step 430, dynamic HTML file 160 representing one or more dynamic portions of template 150 is generated. In one embodiment, the identified dynamic portions of template 150 are copied directly to dynamic HTML file 160. In another embodiment, template 150 includes instructions for the generation of one or more dynamic portions. For example, template 150 could have instructions to include the top story from a news website as part of the web page or web site to be generated from template 150. In this case, dynamic HTML file 160 could be generated based on the instructions. In at least one embodiment, dynamic HTML file 160 further includes static references 321, 323 used to access static portions 311, 313 in static HTML file 170. In one embodiment, static references 321, 323 include JavaScript function calls, such as "document.write( )," for referencing static portions 311, 313 in static HTML file 170 as JavaScript array elements. After generating dynamic HTML file 160, in one embodiment, the file is then transmitted to user 130 (FIG. 1). As previously discussed, if dynamic HTML file 160 was generated as a result of a first request for the file by user 130, static HTML file 170 also may be sent if it is not stored local to user 130. Note that although steps 410-430 are illustrated in a certain order, the illustrated steps may be performed in any reasonable order without departing from the spirit or the scope of the present invention. Although generation of dynamic HTML file 160 and static HTML file 170 from template 170 has been discussed according to one embodiment, in another embodiment, remote site 105 generates and stores dynamic HTML file 160 and static HTML file 170 separately, without using a template, and transmits dynamic HTML file 160 (and/or static HTML file 170) in response to HTML request 140 from user 130.

Figure 5:
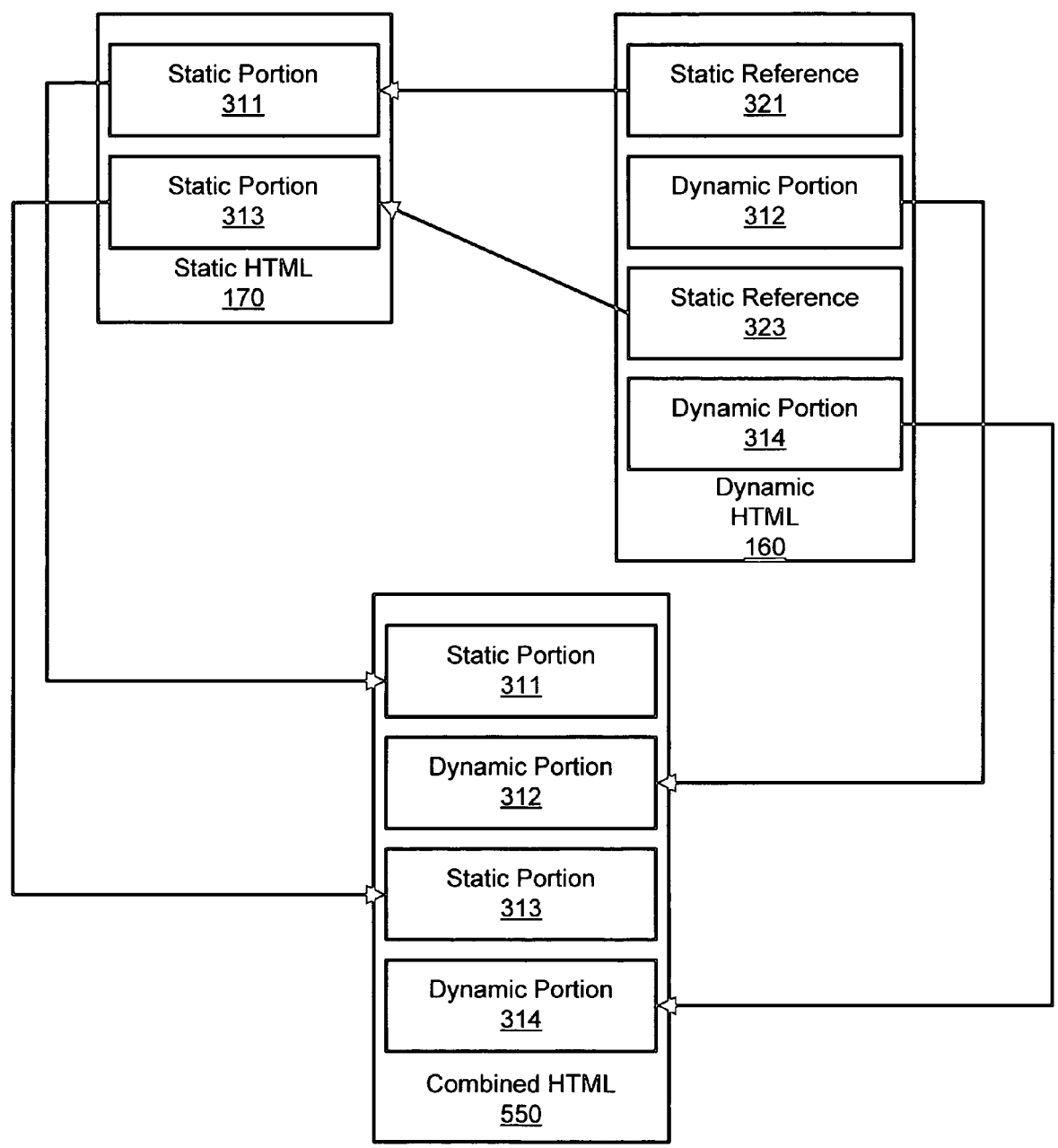
FIG. 5 is a block diagram illustrating a method for recombining dynamic information and static information to generate an original set of information according to at least one embodiment of the present invention.
Figure 6:
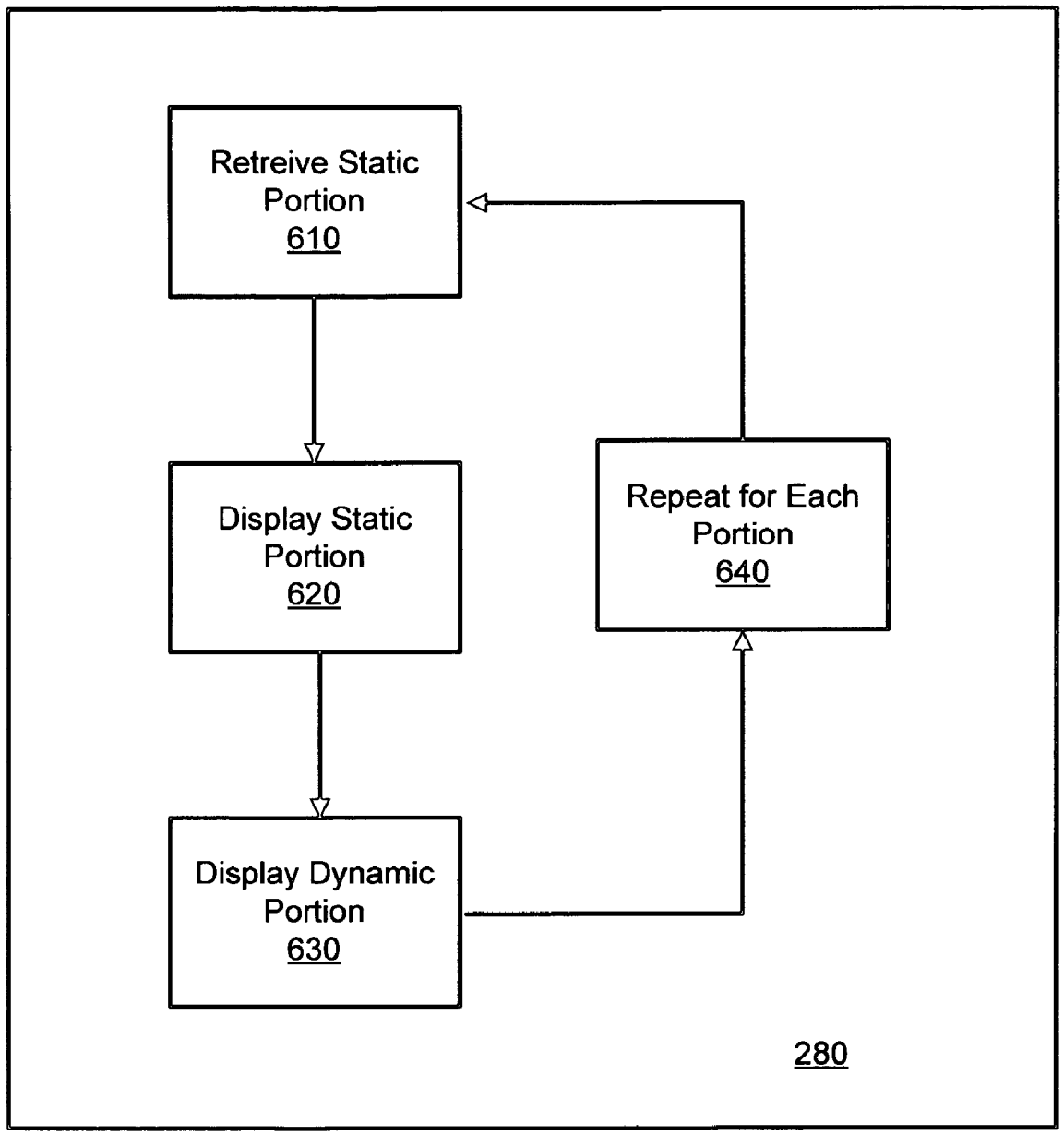
FIG. 6 is a flow diagram illustrating a method for recombining dynamic information and static information to generate an original set of information according to at least one embodiment of the present invention.

As discussed previously with reference to step 230 of FIG. 2, in at least one embodiment, user 130 uses the dynamic HTML file 160 and static HTML file 170 to reconstruct the original information, such as a web site or web page represented by template 150. Referring to FIGS. 5 and 6, a method for reconstructing and combining the dynamic and static portions is illustrated according to at least one embodiment of the present invention. As mentioned previously, although the following method is discussed using HTML files to display a web page on user 130, the method can be applied to other information formats and processing methods without departing from the spirit or the scope of the present invention.

User 130 (FIG. 1), in one embodiment, uses static reference 321 to retrieve first static portion 311 from static HTML file 170 stored locally on, or locally accessible to, user 130 in step 610. As discussed previously, if user 130 cannot locally access static HTML file 170, in one embodiment, user 130 sends a request to remote site 105 (FIG. 1) for the file, and upon receipt, stores it locally where it can be accessed. In another embodiment, dynamic HTML file 160 includes an instruction or reference to the filename of static HTML file 170. For example, dynamic HTML file 160 could include the following line of HTML code:

<script *src*=userid__010120011200.*js*></script> where "src=userid__010120011200.js" identifies the file "userid__010120011200js" as static HTML file 170. Upon processing this code, a web browser on user 130 could attempt to locate the file, or alternatively, any "document.write( )" function calls subsequent to the "script src=" line of HTML code could cause the web browser to attempt to locate the file. The "document.write( )" function call would then use the JavaScript array stored in file "userid__010120011200.js" as the source array. When searching for static HTML file 170, the web browser on user 130, in one embodiment, first checks for the file "userid__010120011200.js" in storage or memory local to user 130. If the file cannot be found locally, the web browser can request the file from remote site 105 and wait for it to be transmitted and received before continuing with the "document.write( )" function call.

In step 620, static portion 311 is displayed in the appropriate format by user 130, such as on a web browser. In step 630, first dynamic portion 312 is displayed by user 130. In step 640, steps 610-630 are repeated for some or all of the static and/or dynamic portions in static HTML file 170 and/or dynamic HTML file 160. Alternately, in another embodiment, the contents of the static portions (static portions 311, 312) and the dynamic portions (dynamic portions 312, 314) are copied into combined HTML file 550 in the order indicated by dynamic HTML file 160. Combined HTML file 550 can then be displayed by user 130. In this case, combined HTML file 550 represents the information represented by template 150 (FIG. 1).

The method of reconstructing and/or recombining static HTML file 170 and dynamic HTML file 160 may be clarified by use of an example. Using the previous example of static HTML file 170 using a JavaScript array (with filename "home0918062221.js"):

```
A = new Array( );
A[1] = '<SCRIPT LANGUAGE="JavaScript">\r\n'+ (contents of static portion 311)
 '        function isblank(s) {'\r\n+
 '            for (var i = 0; i < s.length; i++ ) {'+
 '                var c = s.charAt(i);'+
 '                if ( (c != \' \' ) && (c != \'\n\') && (c != \'\t\') ) return false;'+
 '            }'+
 '            return true;'+
 '        }'+\r\n
'</SCRIPT\r\n>';
A[2]='<SCRIPT LANGUAGE="JavaScript">\r\n'+ (contents of static portion 313)
 '        function isnotblank(s) {'\r\n+
 '            for (var i = 0; i < s.length; i++ ) {'+
 '                var c = s.charAt(i);'+
 '                if ( (c == \' \' ) || (c == \'\n\') || (c == \'\t\') ) return false;'+
 '            }'+
 '            return true;'+
 '        }'+\r\n
'</SCRIPT\r\n>';
```

An example dynamic HTML file 160 using the JavaScript function call "document.write( )" to reference static portions:

```
<HTML>
<HEAD>
    <TITLE>Example HTML</TITLE>
</HEAD>
<FRAMESET FRAMEBORDER=NO BORDER=0 ROWS="100,*">
    <FRAME NAME="title" SRC="title.html" SCROLLING="NO">
        <FRAMESET FRAMEBORDER=NO BORDER=0 COLS="155,*">
</FRAMESET>
<script src=home0918062221.js></script>
<script>document.write(A[1]);</script>    (static reference 321)
<script>document.write(A[2]);</script>    (static reference 323)
<BODY>
</BODY>
</HTML>
```

15

The "document.write( )" function calls (static references 321, 323) reference the JavaScript array elements A[1] (static portion 311) and A[2] (static portion 313) respectively. Note also the HTML code "<script src=home0918062221.js></script>" that references the file "home0918062221.js" as static HTML file 170 and the source for the "document.write( )" function calls. After user 130 processes dynamic HTML file 160, a resulting combined HTML file 550 would appear as below:

```
<HTML>
<HEAD>
    <TITLE>Example HTML</TITLE>
</HEAD>
<FRAMESET FRAMEBORDER=NO BORDER=0 ROWS="100,*">
    <FRAME NAME="title" SRC="title.html" SCROLLING="NO">
        <FRAMESET FRAMEBORDER=NO BORDER=0 COLS="155,*">
</FRAMESET>
<SCRIPT LANGUAGE="JavaScript">
    function isblank(s) {
        for (var i = 0; i < s.length; i++ ) {
            var c = s.charAt(i);
            if ( (c 1 = ' ') && (c 1 = '\n') && (c 1 = '\t') ) return false;
        }
        return true;
    }
</SCRIPT>
<SCRIPT LANGUAGE="JavaScript">
    function isnotblank(s) {
        for (var i = 0; i < s.length; i++ ) {
            var c = s.charAt(i);
            if ( (c == ' ') || (c == '\n') || (c == '\t') ) return false;
        }
        return true;
    }
</SCRIPT>
<BODY>
</BODY>
</HTML>
```

Using static references 321, 323 included in dynamic HTML file 160, user 130 is able to reconstruct the original information represented by template 150 (FIG. 1). Since the dynamic portion of template 150 changes relatively often, while the static portion does not, user 130 can view web sites or web pages having dynamic information without having to download all of the information associated with the web site or web page each time the web page is accessed. Instead, only the dynamic portion is retrieved during each access, with the static portion only being retrieved occasionally as the static portion is modified, resulting in less information to download, thereby decreasing download time and/or bandwidth used.

Figure 7:
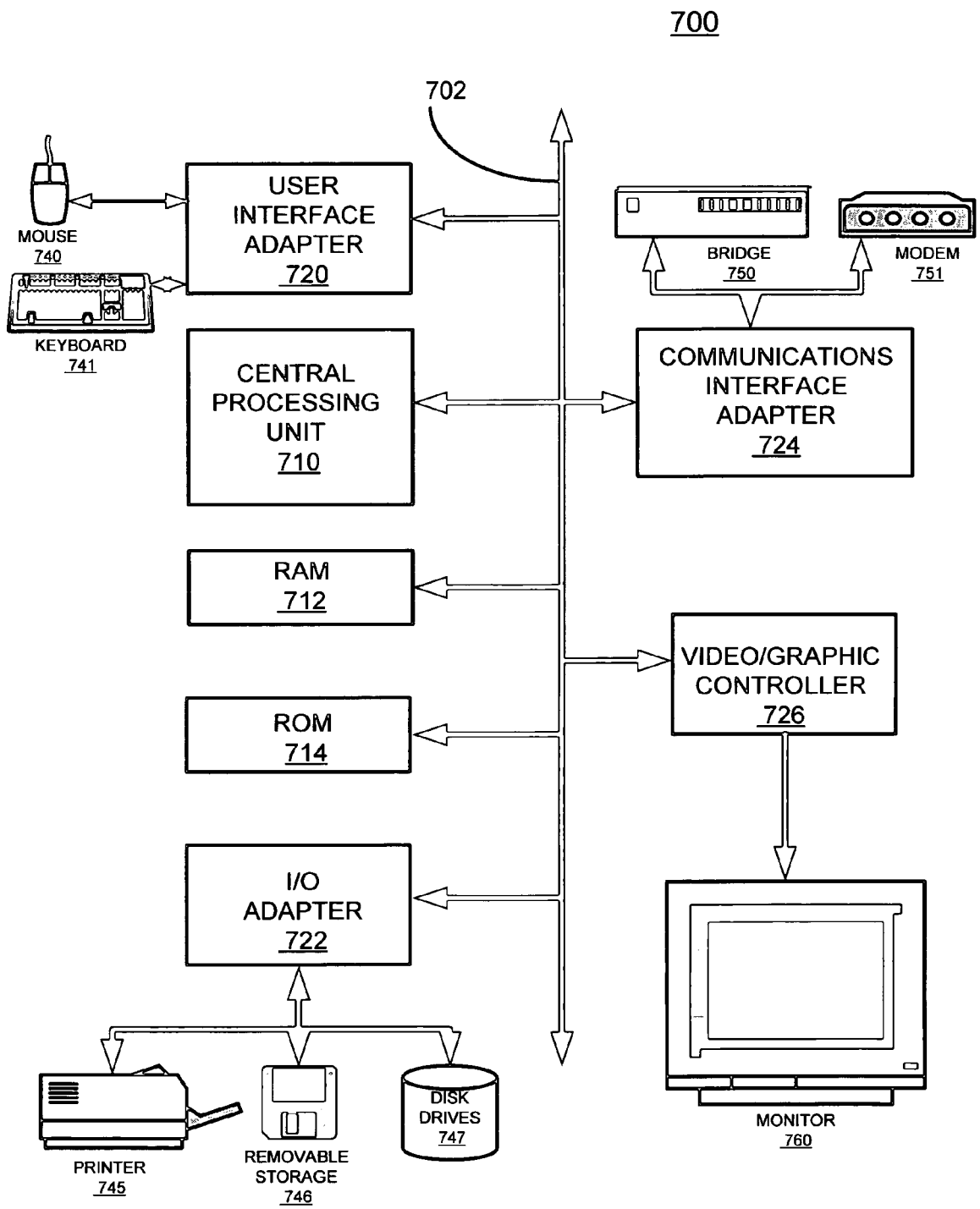
FIG. 7 is a block diagram illustrating one implementation of a content server according to at least one embodiment of the present invention.

Referring to FIG. 7, a processing device in the form of computer system 700 is illustrated according to at least one embodiment of the present invention. In at least one embodiment, computer system 700 represents, at least in part, template server 110, content server 120, and/or user 130. Computer system 700 includes central processing unit 710, which may be a conventional proprietary data processor, memory including random access memory 712, read only memory 714, and input output adapter 722, user interface adapter 720, communications interface adapter 724, and multimedia controller 726. Input output (I/O) adapter 726 is further connected to, and controls, disk drives 747, printer 745, removable storage devices 746, as well as other standard and proprietary I/O devices. User interface adapter 720 can be considered to be a specialized I/O adapter. Adapter 720 is illustrated to be connected to mouse 740, and keyboard 741. In addition, user interface adapter 720 may be connected to other devices capable of providing various types of user control, such as touch screen devices. Communications interface adapter 724 is connected to bridge 750 such as is associated with a local or a wide area network, and modem 751. By connecting system bus 702 to various communication devices, external access to information can be obtained. Multimedia controller 726 generally includes a video graphics controller capable of displaying images upon monitor 760, as well as providing audio to external components (not illustrated). Generally, computer system 700 will be capable of implementing the system and methods described herein.

It should be understood that the specific steps indicated in the methods herein, and/or the functions of specific modules herein, may be implemented in hardware and/or software. For example, a specific step or function may be performed using software and/or firmware executed on one or more processing modules. In general, a system for processing information may include a more generic processing module and memory. The processing module can be a single processing device or a plurality of processing devices. Such a processing device may be a microprocessor, a microcontroller, a digital processor, a microcomputer, a portion of a central processing unit, a state machine, logic circuitry, and/or any device that manipulates the signal.

The manipulation of these signals is generally based upon operational instructions represented in a memory. The memory may be a single memory device or a plurality of memory devices. Such a memory device may be a read only memory, a random access memory, a floppy disk memory, magnetic tape memory, erasable memory, a portion of a system memory, and/or any device that stores operational instructions in a digital format. Note that when the processing module implements one or more of its functions, it may do so where the memory storing the corresponding operational instructions is embedded within the circuitry comprising a state machine and/or other logic circuitry.

Figure 8:
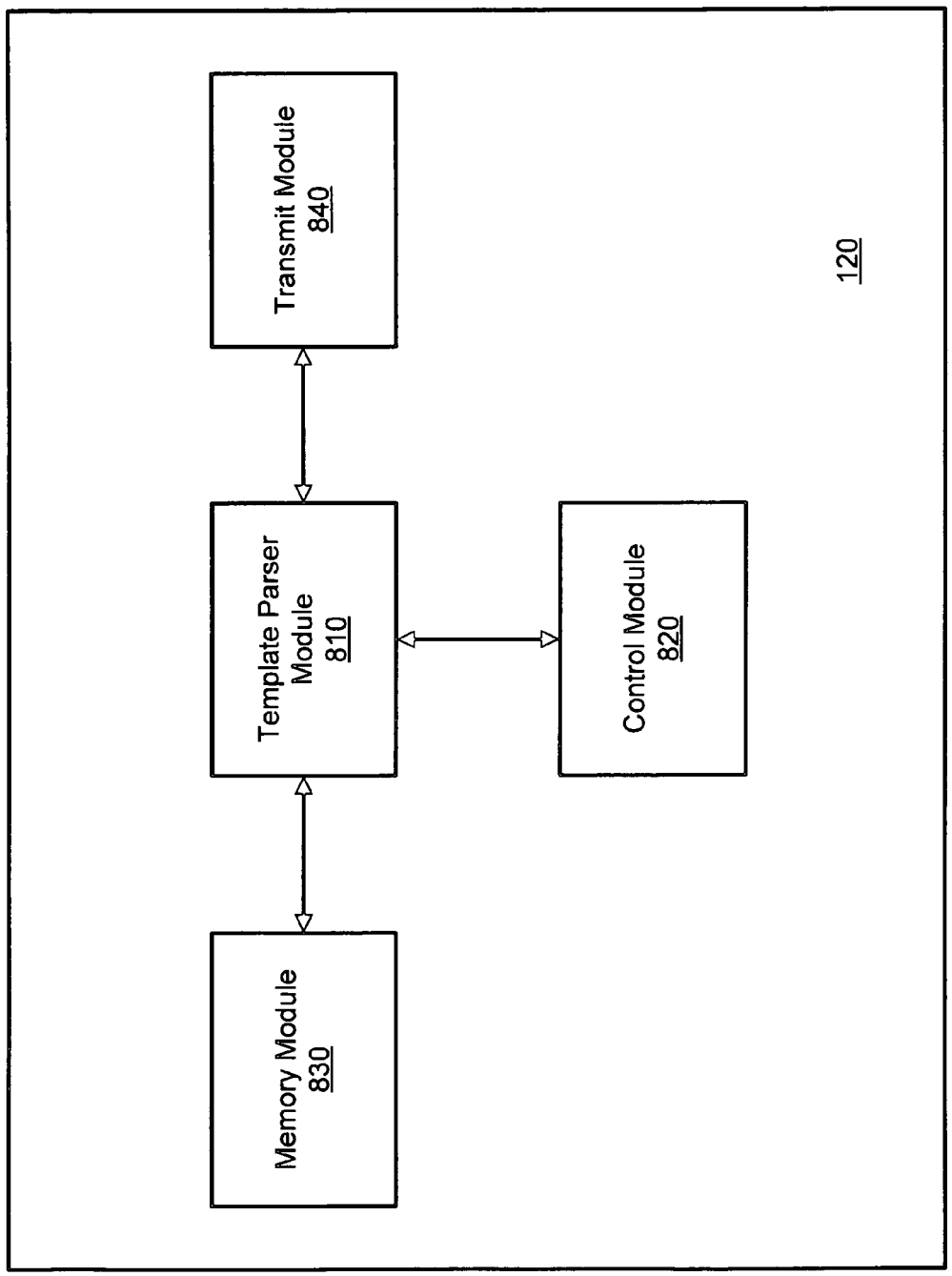
FIG. 8 is a block diagram illustrating a system apparatus having different modules implemented by a content server according to at least one embodiment of the present invention.

Referring to FIG. 8, a block diagram representing the main modules of content server 120 is illustrated according to at least one embodiment of the present invention. Content server 120, as illustrated, includes template parser module 810, control module 820, memory module 830, and transmit module 840. Template parser module 810, in one embodiment, parses a set of information or a file into one or more dynamic portions and static portions based on template 150 (FIG. 1). The methods by which template parser module 810 parses the set of information were discussed previously. In one embodiment, template parser module 810 may be implemented as a set of instructions stored and retrieved from memory 830 to be executed by a processor such as central processing unit 710. Template parser module 810 can also be implemented as a state machine, logic circuitry, and the like.

Control module 820, in one embodiment, controls the operation of template parser 810. For example, control module 820 could direct the retrieval of template 150 from memory module 830 as well as the storage of the results of the operations of template parser module 810 on template 150. As with template parser module 810, control module 820 could be implemented as a set of instructions to be executed by a processor, a state machine, logic circuitry, and the like. It will also be appreciated that template parser module 810 and control module 820 may be implemented on the same device or processor, or in the same set of executable instructions. Memory module 830 can include any device or system capable of storing information and making information available to template parser module 810. For example, memory module 830 could be implemented as random access memory 712, read only memory 714, a disk storage device, and the like.

Transmit module 840, in one embodiment, is used for transmitting and/or receiving information to and from content server 120. For example, transmit module 840 could be used to receive an updated template 150 from template server 110 (FIG. 1) and then transmit the results of the operations of template parser module 810 on template 150 to user 130 (FIG. 1) as discussed previously. Transmit module 840 may be implemented as a set of executable instructions, one or more devices or systems such as communications interface adapter 724, bridge 750, and/or modem 751 (FIG. 7), or a combination thereof. It will be appreciated that content server 120 can include additional modules necessary to implement the methods disclosed herein without departing from the spirit or the scope of the present invention.

Figure 9:
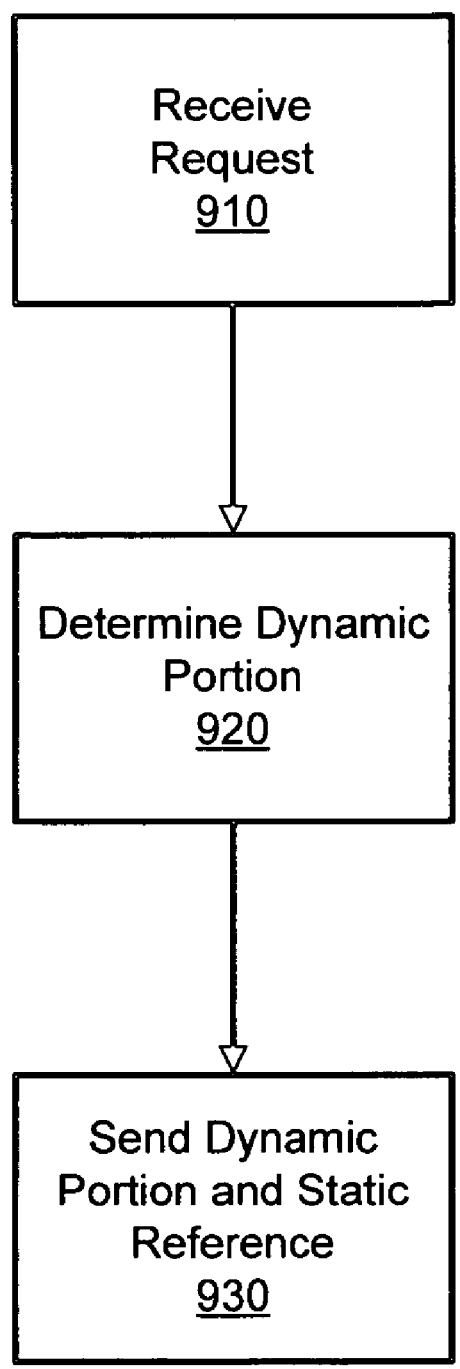
FIG. 9 is a flow diagram illustrating a method for transmission of information according to at least one embodiment of the present invention.

Referring now to FIG. 9, a block diagram illustrating a method for transmission of a set of information having dynamic information and static information is discussed according to at least one embodiment of the present invention. In step 910, remote site 105 (FIG. 1) receives a request for a set of information having static information and dynamic information from user 130 (FIG. 1). As discussed previously, the set of information, in one embodiment, is one or more HTML files that represent a web page or website. In this case, user 130 uses a URL to request the one or more HTML files. In step 920, remote site 105 determines one or more dynamic portions of the set of information requested by user 130. Using the HTML example, remote site 105, using an administrator or an automated utility, could determine dynamic portions based on an identifier or tag that indicates the non-dynamic portions (i.e. static portions), or the tag could indicate the dynamic (i.e. static) portions. Alternately, remote site 105 could analyze the HTML files and make the determination of static or dynamic portions based on the properties of the portions. After determining the one or more dynamic portions, in one embodiment, step 920 further includes generating a file having the contents of the one or more dynamic portions, as well as references for accessing the one or more static portions. Methods for determining dynamic and/or static portions as well as referencing static portions were described previously in greater detail.

In step 930, the contents of one or more dynamic portions and references to one or more static portions of the set of information are sent to user 130 (FIG. 1). In at least one embodiment, the references to one or more static portions are used to retrieve the static portions from a location local to user 130. For example, the references to one or more static portions could be JavaScript function calls which reference a JavaScript array, where the elements of the array contain the contents of the one or more static portions. If user 130 is not able to access the one or more static portions locally, in one embodiment, user 130 requests the static portions from remote site 105. After receiving the static portions, or if they were already located local to user 130, user 130 proceeds to use the dynamic portions, the references to the static portions, and the static portions to generate the original set of information requested by user 130 from remote site 105. Methods for utilizing the dynamic portions and the references to the static portions to generate the original set of information were discussed in greater detail previously.

The various functions and components in the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

One of the preferred implementations of the invention is as sets of computer readable instructions resident in the random access memory of one or more processing systems configured generally as described in FIGS. 1-9. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another image processing system and transmitted over a local area network or a wide area network, such as the Internet. The preceding detailed description is, therefore, not to be taken in a limiting sense, and the scope of the present invention is defined only by the appended claims.

What is claimed is:

1. A method of transmitting information, the method comprising:
   receiving a first request to access a webpage from a user location;
   in response to the first request, dividing a file associated with the webpage at a first server into at least one portion of dynamic information and at least one portion of static information, wherein the first server is located at a first location;
   determining a file name for the at least one portion of dynamic information and a file name for the at least one portion of static information after receiving the first request, wherein the file name for the at least one portion of dynamic information and the file name for the at least one portion of static information each include a timestamp; and
   sending the at least one portion of dynamic information from the first server located at the first location to the user location for display in response to the first request, wherein the at least one portion of dynamic information that is sent includes the file name of the at least one portion of static information, wherein the file name of the at least one portion of static information enables accessing at the user location the at least one portion of static information that was previously sent to the user location from a second server, wherein the second server is located at a second location that is different from the first location.

2. The method of claim 1, wherein the file is executable to produce a display, and wherein the at least one portion of static information and the at least one portion of dynamic information are combined at the user location to yield the display.

3. The method of claim 1, wherein the file comprises a Hypertext Mark-Up Language (HTML) file.

4. The method of claim 3, wherein the at least one portion of dynamic information is stored in a format based on a HTML language and the at least one portion of static information is stored in a format based on a scripting language.

5. The method of claim 4, wherein
   the at least one portion of static information includes a script array;
   wherein the script array comprises a plurality of elements; and
   wherein each of the plurality of elements includes a portion of the at least one portion of static information.

6. The method of claim 3, wherein the HTML file includes an occurrence of a tag, wherein the occurrence of the tag identifies the at least one portion of static information.

7. The method of claim 3, wherein the HTML file is executable to produce the webpage, and wherein the at least one portion of dynamic information and the at least one portion of static information are combined at the user location to display the webpage.

8. The method of claim 1, wherein the first request is for a HTML file associated with a uniform resource locator (URL) address.

9. The method of claim 1, wherein the file further comprises a set of control information.

10. The method of claim 9, further comprising:
    sending the at least one portion of dynamic information and the at least one portion of static information to a remote system in response to a request for the set of control information, wherein the at least one portion of static information is to be cached on the remote system; and
    sending the at least one portion of dynamic information to the remote system in response to a subsequent request for the set of control information, wherein the at least one portion of dynamic information is to be used in conjunction with the at least one portion of static information cached on the remote system to implement a set of instructions.

11. The method of claim 9, further comprising sending the set of control information to the user location, wherein the set of control information includes instructions to determine availability of the at least one portion of static information at the user location.

12. The method of claim 11, wherein the set of control information further includes information to request the at least one portion of static information from a remote location relative to the user location when the at least one portion of static information is unavailable at the user location.

13. The method of claim 1, further comprising:
    receiving a second request from the user location; and
    sending a representation of the at least one portion of static information to the user location in response to the second request.

14. The method of claim 1, further comprising determining at the first server whether a user device that sent the first request is capable of generating a display using the at least one portion of static information and the at least one portion of dynamic information before sending the at least one portion of dynamic information to the user location.

15. The method of claim 14, wherein the first request includes user agent information, and wherein the determination of whether the user device is capable of generating the display is made using the user agent information.

16. A method of receiving information, the method comprising:
    sending a first request to a server location;
    receiving, at a user location, at least one portion of dynamic information of a file and at least one portion of static information of the file in response to the first request;

determining whether the at least one portion of dynamic information includes at least one file identifier that references the at least one portion of static information of the file;

determining whether the at least one portion of static information is available at the user location;

accessing the at least one portion of static information of the file based on the at least one file identifier including a timestamp when the at least one portion of dynamic information includes the at least one file identifier; and generating a display by combining the at least one portion of static information and the at least one portion of dynamic information, wherein the at least one portion of dynamic information is stored in a format based on a Hypertext Mark-Up Language (HTML) language and wherein the at least one portion of static information is stored in a format based on a scripting language and includes a script array;

wherein, when the at least one portion of static information is not available at the user location, accessing the at least one portion of static information includes:

sending a second request to the server location wherein the second request includes the at least one file identifier;

caching the at least one portion of static information;

receiving updated dynamic information, in response to the second request; and combining the updated dynamic information received in response to the second request with the cached at least one portion of static information to generate the display.

17. The method of claim 16, wherein the file comprises a set of control information.

18. The method of claim 16, wherein the at least one portion of static information is cached at the user location, and wherein accessing the at least one portion of static information comprises accessing the cached static information.

19. The method of claim 16, wherein the at least one file identifier comprises information identifying a time when the file was divided into the at least one portion of static information and the at least one portion of dynamic information.

20. A non-transitory computer-readable storage medium comprising instructions that, when executed by a processor, cause the processor to:

send a first request to a server location;

receive, at a user location, at least one portion of dynamic information of a file and at least one portion of static information of the file in response to the first request;

determine whether the at least one portion of dynamic information includes at least one file identifier that references the at least one portion of static information of the file;

determine whether the at least one portion of static information is available at the user location;

access the at least one portion of static information of the file based on the at least one file identifier when the at least one portion of dynamic information includes the at least one file identifier; and generate a display by combining the at least one portion of static information and the at least one portion of dynamic information, wherein the at least one portion of dynamic information is stored in a format based on a Hypertext Mark-Up Language (HTML) language and wherein the at least one portion of static information is stored in a format based on a scripting language and includes a script array;

wherein, when the at least one portion of static information is not available at the user location, accessing the at least one portion of static information includes:

sending a second request to the server location wherein the second request includes the at least one file identifier;

caching the at least one portion of static information;

receiving updated dynamic information, in response to the second request; and combining the updated dynamic information received in response to the second request with the cached at least one portion of static information to generate the display.

21. The non-transitory computer-readable storage medium of claim 20, wherein the at least one file comprises a set of control information, and wherein the file identifier includes a timestamp.

22. The non-transitory computer-readable storage medium of claim 21, wherein the set of control information includes instructions to determine availability of the at least one portion of static information at the user location.

* * * * *